United States Patent [19]

Kuna

[11] 4,209,113
[45] Jun. 24, 1980

[54] LIQUID EJECTING TOY

[75] Inventor: Wayne A. Kuna, Elmhurst, Ill.

[73] Assignee: Marvin Glass & Associates, Chicago, Ill.

[21] Appl. No.: 968,195

[22] Filed: Dec. 11, 1978

[51] Int. Cl.² .............................................. B05B 9/06
[52] U.S. Cl. ................................. 222/79; 46/175 R
[58] Field of Search ................. 222/383, 384, 79, 180, 222/181; 116/139; 46/91, 175; 239/320, 331

[56] References Cited

U.S. PATENT DOCUMENTS

| | | | |
|---|---|---|---|
| 1,718,985 | 7/1929 | Scoville | 222/383 |
| 3,288,332 | 11/1966 | Etter et al. | 222/383 X |
| 3,677,446 | 7/1972 | Guyer, Jr. | 46/175 R |

*Primary Examiner*—Stanley H. Tollberg

*Attorney, Agent, or Firm*—Mason, Kolehmainen, Rathburn & Wyss

[57] ABSTRACT

A toy liquid ejecting device includes a refillable liquid supply reservoir which is connected to a discharge chamber by a gravity operated check valve. A selectively operable actuator pressurizes fluid within the discharge chamber to effect a pressurized liquid stream discharge to the atmosphere. A spring actuated check valve in the discharge path closes to permit refilling of the discharge chamber during recycling of the actuator. The enclosure for the device is formed and sized to resemble a futuristic device, such as a laser weapon, and includes a mounting bracket for detachably mounting the device on the handle bars of a bicycle or other vehicle.

8 Claims, 6 Drawing Figures

U.S. Patent  Jun. 24, 1980  4,209,113
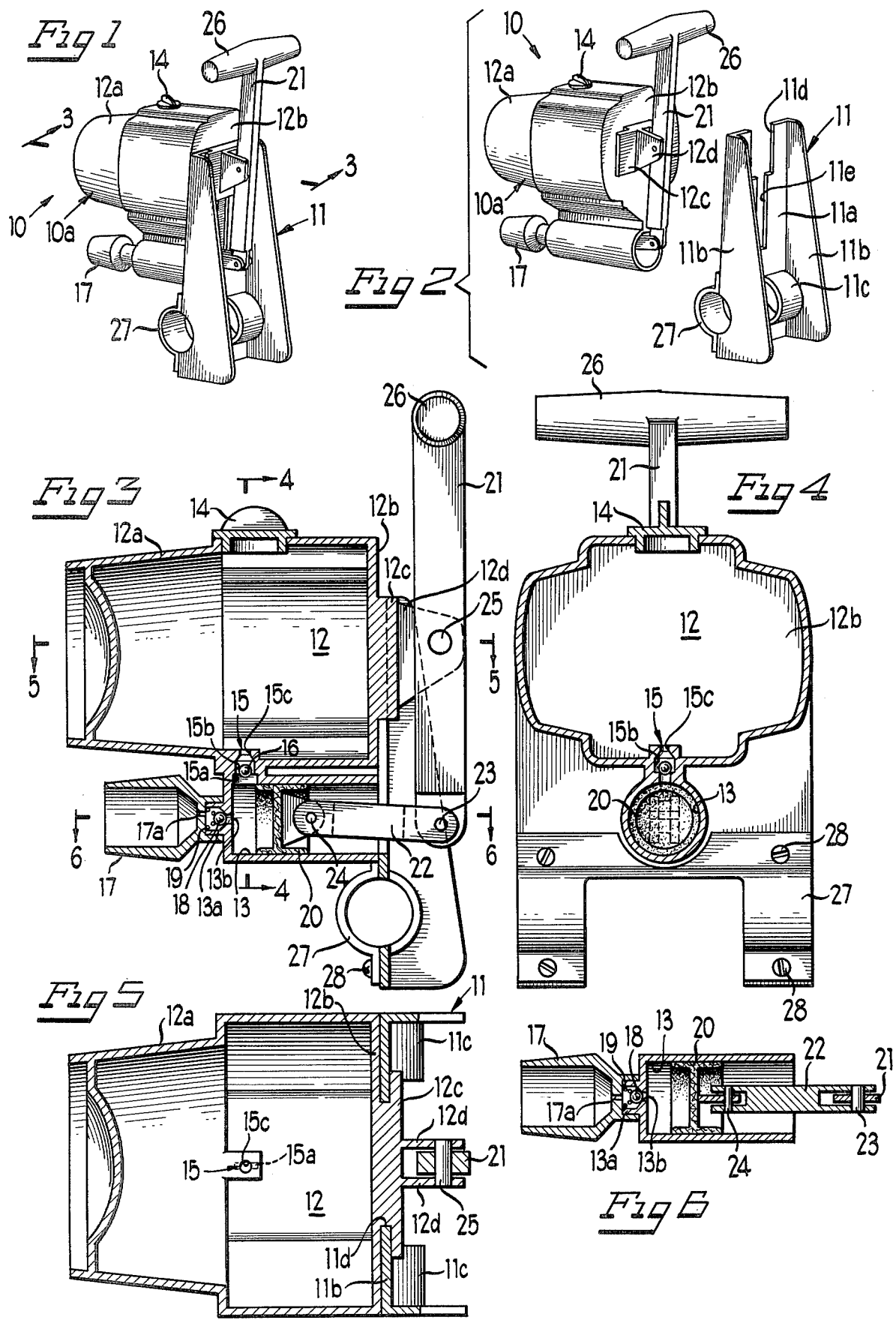

LIQUID EJECTING TOY

BACKGROUND OF THE INVENTION

1. Field of the Invention

The present invention relates to toys and more particularly to an improved liquid ejecting toy which is adapted to be detachably mounted on a wheeled vehicle, such as a bicycle or tricycle, and may be manually operated to emit a pressurized stream of liquid, such as water, which simulates the appearance of a laser beam.

2. Brief Description of the Prior Art

Many toys have been proposed in the field of ejectors, such as squirt guns and hose nozzles, which provide much enjoyment for children because of their safe and harmless use of a liquid, such as water, as the ejected medium. However, in the past, no such devices have been provided which are based on a space theme and include means for removably mounting the unit on, for example, the frame of a bicycle to provide greater leverage and thus more pressure to be applied to the discharge chamber.

SUMMARY OF THE INVENTION

It is an object of the present invention to provide a liquid ejecting toy of the character indicated which is of rugged and low cost construction.

It is another object of the invention to provide a liquid ejecting toy of the type indicated which may be easily and quickly mounted upon a wheeled vehicle and when so mounted may easily be operated by the vehicle operator repeatedly to eject pressurized streams of liquid into the atmosphere.

In the disclosed embodiment of the invention, the toy is provided with a liquid supply reservoir and a discharge reservoir or chamber disposed one above the other in the order named, and manually operable means are provided for pressurizing fluid within the discharge chamber to effect a pressurized liquid stream discharge from the toy to the atmosphere and for inducing the flow of liquid from the supply reservoir into the discharge chamber to recharge the discharge chamber for another operation of the toy. Selfacting valve means are provided in the toy for preventing liquid leakage from the toy when it is not being operated and for preventing the reverse flow of liquid from the discharge chamber back into the supply reservoir when the liquid in the discharge chamber is being pressurized.

BRIEF DESCRIPTION OF THE DRAWINGS

The invention, both as to its organization and method of operation, together with further objects and advantages thereof, will best be understood by reference to the following specification taken in connection with the accompanying drawing, in which:

FIG. 1 is a perspective view of the present improved toy;

FIG. 2 is another partially exploded perspective view showing the toy separated from its detachable supporting bracket;

FIG. 3 is a sectional view taken along line 3—3 of FIG. 1;

FIG. 4 is a sectional view taken along line 4—4 of FIG. 3;

FIG. 5 is a sectional view taken along line 5—5 of FIG. 3; and

FIG. 6 is a sectional view taken along line 6—6 of FIG. 3.

DESCRIPTION OF THE PREFERRED EMBODIMENT

Referring now to the drawings and more particularly to FIGS. 1 and 2 thereof, there is illustrated a fluid ejecting toy 10 which is adapted to be detachably mounted on one of the handle bars of a wheeled vehicle, such as a bicycle or tricycle, by means of a mounting bracket 11. The toy 10 comprises thin walled structural means 10a of unitary construction and preferably formed of a plastic material which is best shown in FIGS. 3 and 4 of the drawings to be configurated to provide an upper liquid supply reservoir or chamber 12 and a lower liquid discharge reservoir or chamber 13. At its front end, the portion 12a of the reservoir 12 is shaped to simulate the nose of futuristic type space vehicles. On its rear end wall 12b, the reservoir 12 is provided with a flat T-shaped bracket receiving portion 12c which is adapted detachably to engage the bracket 11 to support the toy 10 on a wheeled vehicle handle bar in the manner explained below. Along its top wall, the supply reservoir is provided with a filler opening which is adapted to be closed by a cap or stopper 14.

In order to permit gravity induced flow of liquid from the supply reservoir 12 to the discharge reservoir 13, the wall interconnecting the two reservoirs is provided with an opening 15 therethrough which opens into the bottom of the reservoir 12 and the top of the reservoir 13. Valve means comprising a valve ball 16 are provided in the opening 15 to prevent the reverse flow of liquid from the discharge chamber 13 into the supply reservoir 12 when the discharge chamber 13 is pressurized in the manner explained below. More specifically and as best shown in FIGS. 3 and 5 of the drawings, the opening 15 is provided with a lower slit-like portion 15a of lesser width than the diameter of the valve ball 16, an intermediate enlarged cylindrical portion 15b in which the valve ball 16 is free to move and around which liquid is free to flow, and an upper cylindrical portion 15c of lesser diameter than the diameter of the valve ball 16 and against the lower end of which the valve ball 16 is adapted to seat when the liquid in the discharge chamber 13 is pressurized.

As best shown in FIGS. 1 and 3 of the drawings, a futuristic type discharge nozzle 17 is provided which includes a recessed neck portion 17a interfitting with and fixedly connected to an annular nose portion 13a of the discharge reservoir 13. The interior of the nozzle 17 is open to the atmosphere at its front end and is in liquid discharge communication with the discharge chamber 13 through openings 17a and 13b cut through the bottom of the nozzle 17 and the front end of the discharge chamber 13. Valve means are provided within the annular neck portion 13a of the discharge chamber 13 to prevent liquid leakage from the discharge chamber when the liquid therein is not pressurized. More specifically, a valve ball 18 biased by means of a small coil spring 19 to seat against and close the open end of the opening 13b function as the desirable valve means and both of the elements 18 and 19 are disposed within the annular neck portion 13a of the discharge chamber 13.

As will be apparent from the drawings, the discharge chamber 13 is of cylindrical configuration throughout its length. For the purpose of pressurizing liquid contained within this chamber, manually operable pressurizing means are provided which includes a piston 20 reciprocally movable within the cylindrical chamber 13 and a lever and linkage mechanism comprising the lever 21 and the piston rod link 22. The two last-mentioned elements are pivotally interconnected by means of a pivot pin 23 and the inner end of the link 22 is pivotally connected to the piston 20 by means of a pivot pin 24. Intermediate its ends, the lever 21 is pivotally attached to the rear end of the liquid supply reservoir 12. In more detail, the bracket piece 12c is provided with rearwardly projecting fingers 12d between which the lever 21 is pivotally mounted by means of a pivot pin 25. At its upper free end, the lever 21 is equipped with a handle 26 which may be grasped by an operator to pivot the lever 21 and thus move the piston 20 between the discharge position shown in FIG. 3 of the drawings and a retracted position wherein substantially the entire length of the cylindrical discharge chamber 13 becomes available for the receipt of liquid from the supply reservoir 12.

As best shown in FIG. 2 of the drawings, the mounting bracket 11 comprises a front wall 11a, two strengthening edge flanges 11b and a lower semi-circular portion 11c which is adapted partially to receive the sectionally round handle for a wheeled vehicle. At its upper end, the bracket wall 11a is provided with a wide slot 11d for receiving the wide stem of the T-shaped bracket receiving part 12c. This slot opens at its base into an elongated narrow slot 11e in the wall 11a which extends downwardly and is adapted to receive and accommodate free movement of the piston rod or link 22 therewithin. In order to fixedly connect the bracket 11 to the handle bar of a bicycle or the like, an elongated clamping member 27 of partial, semi-circular cross section is provided which is adapted to be screw connected to the lower portion of the bracket wall 11a opposite the lower semi-circular portion 11c of the bracket. Specifically, and as best shown in FIGS. 3 and 4 of the drawings, screws 28 are employed to mount the clamping member 27 on the vehicle handle bar with this bar clamped therebetween. With the bracket 11 thus rigidly mounted on the vehicle handle bar, it is an easy matter to attach or detach the toy 10 therefrom by simply sliding the bracket receiving element 12c into and out of engagement with the slotted wall 11a of the bracket.

The manner in which the toy is used and its mode of operation will be understandable from the foregoing explanation. Briefly summarized, with the toy 10 detached from the supporting bracket 11, and, with the stopper 14 removed from the filler opening, and with the piston 20 in its fully retracted position within the discharge chamber 13, the two reservoirs 12 and 13 may easily be filled with water from an ordinary faucet following which the stopper 14 may be inserted in the filler opening and the toy 10 may be mounted on the bracket 11 ready for use. During the filling operation, water flows from the supply reservoir 12 through the opening 15 into the discharge chamber 13 until the discharge chamber has been filled.

After the two reservoirs or chambers 12 and 13 are thus filled with water, the stopper 14 may be reinserted in the filler opening and the toy 10 may be mounted upon the bracket 11 in a manner which will be fully understood from the preceding explanation. The toy 10 is now ready for operation. In order to operate the toy, the handle 26 is rapidly drawn back toward the wheeled vehicle operator. As a consequence, the lever 21 is pivoted clockwise as viewed in FIG. 3 of the drawings and the piston 20 is moved from its retracted position to its discharge position within the cylindrical discharge chamber 13, thereby to pressurize the liquid within this chamber.

As the fluid pressure builds up in the chamber 13 in response to the described movement of the piston 20, the valve ball 16 snaps to its closed position against the lower open end of the opening 15c and thus stops the reverse flow of liquid from the discharge chamber 13 into the supply reservoir 12. Substantially simultaneously, the pressurized fluid within the chamber 13 pushes the valve ball 18 to its open position against the action of the biasing spring 19, thus permitting the pressurized liquid to flow at a high rate through the opening 17a and through the nozzle 17 to the atmosphere. The liquid stream which is thus ejected from the toy 10 simulates a laser beam in appearance, particularly in bright sunshine.

When the pressurized liquid supply in the discharge chamber 13 is exhausted, ejection of the liquid stream through the nozzle 17 stops. The discharge chamber 13 may be recharged with liquid from the supply reservoir 12 by pushing the handle 26 forward, thereby moving the piston 20 from its illustrated discharge position to its retracted position through operation of the lever-linkage mechanism comprising the lever 21 and the link 22. During such movement of the piston 20, the valve ball 18 snaps to its closed position under the biasing influence of the bias spring 19, the valve ball 16 drops to its open position and liquid is sucked from the supply reservoir 12 through the opening 15 into the discharge chamber 13 until the discharge chamber is fully recharged with liquid. As will be apparent from the foregoing explanation, the toy 10 may be repeatedly operated to produce a succession of laser simulating liquid stream emissions therefrom from a single filling of the liquid supply reservoir 12.

While there has been illustrated and described what is presently considered to be the best mode of practicing the invention, it will be understood that various modifications may be made therein which are within the true spirit and scope of the invention as defined in the following appended claims.

I claim:
1. A liquid ejecting toy for projecting a stream of liquid from a vehicle, comprising:
   unitary structural means defining an upper liquid supply chamber and a lower discharge chamber, said unitary structural means including inlet means at the top thereof for receiving a predetermined amount of liquid in said upper liquid supply chamber and an opening between the supply chamber and the discharge chamber to permit gravity induced flow of liquid from the supply chamber to the discharge chamber;
   valve means in said opening for closing and opening in response to pressure buildup when said liquid in said discharge chamber is pressurized;
   a discharge nozzle in communication with said discharge chamber having an opening therethrough for discharging liquid in a stream from the discharge chamber to the atmosphere when the liquid in said discharge chamber is pressurized, said nozzle having spring biased valve means for normally closing said opening and adapted to move to permit liquid discharge therethrough when the liquid in said discharge chamber is pressurized; and manually operable means for selectively pressurizing the liquid in said discharge chamber, said manually operable pressurizing means including a piston reciprocally mounted in a cylindrical portion of said discharge chamber and a first class lever-linkage mechanism pivotally mounted to said supply chamber for moving said piston to vary the volume of the discharge chamber.

2. The liquid ejecting toy of claim 1 wherein a portion of said supply chamber extends past the end of said nozzle in a parallel direction.

3. The liquid ejecting toy of claim 1 or 2 wherein said nozzle is surrounded by a futuristic frusto-conical enlarged opening.

4. The liquid ejecting toy of claim 3 wherein said frusto-conical enlarged element includes a plurality of radial fins.

5. The liquid ejecting toy of claim 2 wherein said parallel extending portion of said supply chamber is frusto-conically shaped and includes a plurality of generally radially directed fins.

6. The liquid ejecting toy of claim 4 including parallel horizontal support means on said unitary structural means for securing the toy to the handlebars of a bicycle.

7. The liquid ejecting toy of claim 6 wherein said support means includes a removable bracket portion.

8. The liquid ejecting toy of claim 7 wherein said removable bracket portion includes slot means for releasably, slidably mounting said liquid ejecting toy on said bracket means.

* * * * *